UNITED STATES PATENT OFFICE.

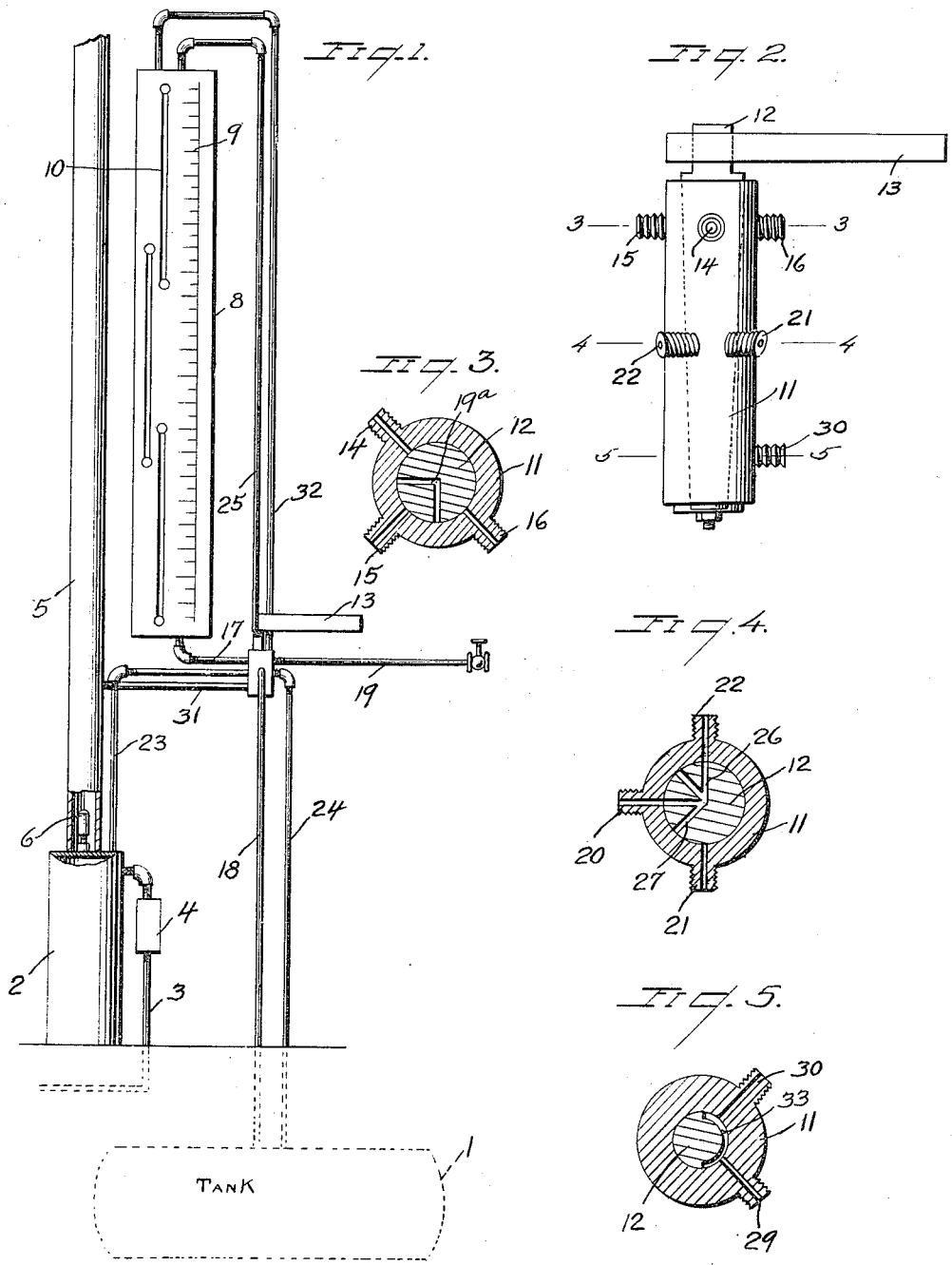

WILLIAM J. BRITTAIN, OF HOLDENVILLE, OKLAHOMA.

MEASURING DEVICE.

1,297,649.　　　Specification of Letters Patent.　　Patented Mar. 18, 1919.

Application filed June 22, 1917. Serial No. 176,356.

*To all whom it may concern:*

Be it known that I, WILLIAM J. BRITTAIN, a citizen of the United States, residing at Holdenville, in the county of Hughes and State of Oklahoma, have invented a new and useful Improvement in Measuring Devices, of which the following is a specification.

My invention is an improvement in measuring devices, and the invention has for its object to provide mechanism of the character specified for measuring liquids, as, for instance, liquid fuel such as gasolene, wherein a storage tank is provided, an air chamber, and a measuring chamber connected in such manner that the liquid may pass from the storage tank to the measuring chamber and be discharged therefrom, and wherein a single valve is provided for controlling the movement of the liquid.

In the drawings:

Figure 1 is a front view of the improvement, with parts in section;

Fig. 2 is a side view of the valve;

Figs. 3, 4 and 5 are sections on the lines 3—3, 4—4 and 5—5, respectively, of Fig. 2.

In the present embodiment of the invention, a storage tank 1 is provided for the liquid fuel, the said tank being arranged beneath the ground, as shown. A reservoir 2 for fluid under pressure is arranged at a suitable point, and this reservoir is connected by a pipe 3 with a suitable source of supply, a pressure regulating valve 4 of usual construction being interposed in the said pipe between the source of supply and the reservoir.

This reservoir 2 has a vent pipe 5 which extends to a suitable height above the ground, and a safety valve 6 is connected with the reservoir and arranged within the vent pipe, for permitting gases to vent when they exceed a certain predetermined pressure.

A measuring chamber 8 is arranged at a suitable point, the said chamber having a scale 9 for showing the amount of liquid within the casing, and having sight openings 10 for permitting the level of the liquid to be seen. It is obvious that this chamber might be of glass, in order that the liquid might be visible. A valve casing 11 is arranged between the tank, the reservoir 2 and the chamber 8, and is connected to the said tank, reservoir and chamber in a manner to be described, and a valve plug 12 is arranged within the casing for controlling the connections.

The casing 11 has three series of ports, and the valve plug 12 has three series of ports or passages for connecting the ports or passages of the casing. The plug is controlled by a handle 13 which is connected therewith above the casing, and preferably the cover of the casing 7 is so arranged that it cannot be closed except when the valve is in neutral position.

Near its top the casing has ports 14, 15 and 16, the said ports being at the same level and arranged at angular intervals of ninety degrees, and the ports 14 and 15 are connected to the measuring chamber 8 and to the storage tank 1, respectively, by pipes 17 and 18. From the port 16 a discharge pipe 19 leads, and the valve 12 at the level of the ports 14, 15 and 16 has a port or passage 19$^a$ consisting of two portions arranged at a right angle with respect to each other and adapted to connect the ports 14 and 15, or to connect the ports 15 and 16.

Intermediate its ends the valve casing 11 has three ports 20, 21 and 22, and pipes 23, 24 and 25 connect the said ports with the air reservoir 2, the storage tank 1 and the measuring chamber 8, respectively. At its lower end the valve has ports 26 and 27, by means of which the ports 20 and 21 may be connected, or the ports 20 and 22, to connect the air reservoir with the storage tank 1, or with the measuring chamber. Near its lower end the valve casing has ports 29 and 30, and pipes 31 and 32 connect the ports with the vent pipe 5 and with the measuring chamber 8, respectively. At this level the valve plug 12 has an annular passage 33, by means of which the ports 29 and 30 are normally connected, except when one or the other is closed by operation.

In operation, when the valve is in neutral position all of the ports of the valve are out of register with the ports of the casing, except 29—30. When the handle 13 is given an eighth turn to the left, the ports 14 and 15 are connected, and the measuring chamber 8 is connected to the storage tank 1 through the pipes 17 and 18. At the same time the reservoir 2 is connected with the storage tank by way of the pipes 23 and 24. The pressure in the storage tank forces the fluid through the pipes 18 and 17 into the measuring chambers, and the air driven from the measuring chamber by the entering fluid passes by way of the pipe 32, the port 30 of the valve casing, the passage 33 of the valve, the port 29 of the valve casing, and the pipe 31 to the vent pipe 5. After the predetermined amount of liquid has been forced into the measuring chamber the valve is moved to neutral position, stopping the flow of liquid, cutting off the supply of air under pressure to the storage tank. The handle is now given an eighth turn to the right, and the ports 15 and 16 are connected, so that the liquid in the measuring chamber may flow by way of the pipe 17, the port 14 of the valve casing, the passage 19 of the valve, and the port 16 of the casing to the place of discharge. At the same time the ports 20 and 22 are connected by the passages 26 and 28 of the valve, thus connecting the pipes 23 and 24, admitting air pressure to the measuring chamber at its top to force out the liquid therein. This above mentioned movement of the valve places the vent port out of communication with the measuring chamber, by moving the passage 33 of the valve out of register with the port 29.

It will be evident that with a single valve all of the connections between the storage tank, the reservoir, the measuring chamber and the vent pipe are made.

I claim:

1. A device of the character specified, comprising a measuring chamber, a reservoir for fluid under pressure having a vent pipe, and a safety valve in the vent pipe, a storage tank, a valve casing, and a valve in the casing, said valve and casing having coöperating ports for simultaneously connecting the reservoir with the storage tank and the storage tank with the measuring chamber, and the measuring chamber with the vent pipe, or for simultaneously connecting the measuring chamber with a discharge, and the reservoir with the measuring chamber to drive out the liquid.

2. A device of the character specified, comprising a measuring chamber, a reservoir for fluid under pressure having a vent pipe, a storage tank, a valve casing, and a valve in the casing, said valve and casing having coöperating ports for simultaneously connecting the reservoir with the storage tank and the storage tank with the measuring chamber, and the measuring chamber with the vent pipe, or for simultaneously connecting the measuring chamber with a discharge, and the reservoir with the measuring chamber to drive out the liquid.

WILLIAM J. BRITTAIN.